Nov. 15, 1938.  R. C. PIERCE ET AL  2,136,908
SNUBBER SPRING
Filed Sept. 8, 1936  3 Sheets-Sheet 1
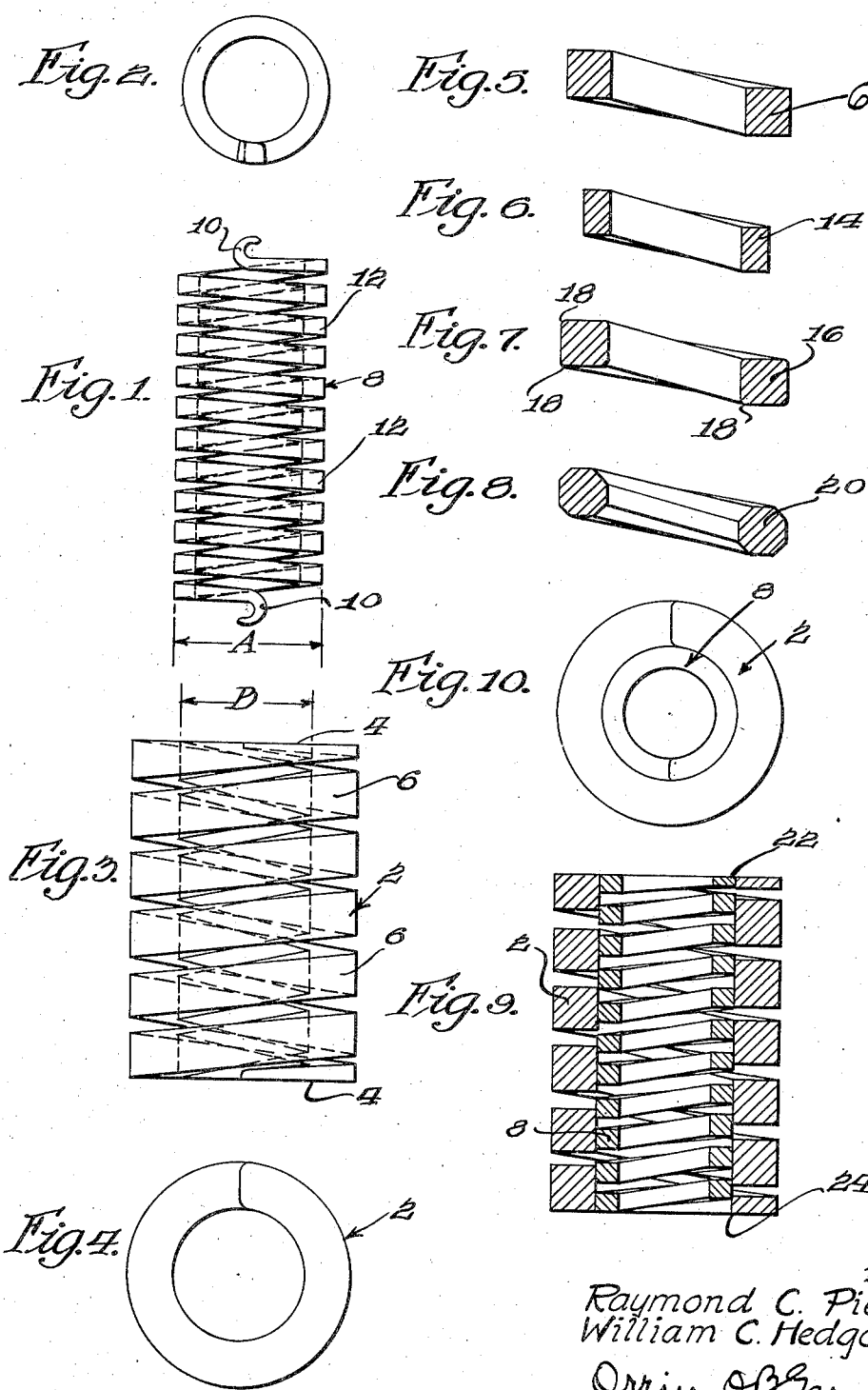
Inventors
Raymond C. Pierce.
William C. Hedgcock.
Orrin O. B. Garner
Attorney Nov. 15, 1938.  R. C. PIERCE ET AL  2,136,908
SNUBBER SPRING
Filed Sept. 8, 1936  3 Sheets-Sheet 2

Inventors
Raymond C. Pierce.
William C. Hedgcock.

Orin O. B. Garner  Attorney

Nov. 15, 1938.   R. C. PIERCE ET AL   2,136,908
SNUBBER SPRING
Filed Sept. 8, 1936   3 Sheets-Sheet 3
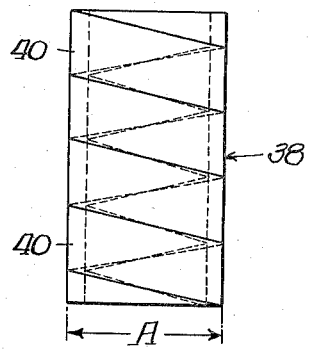
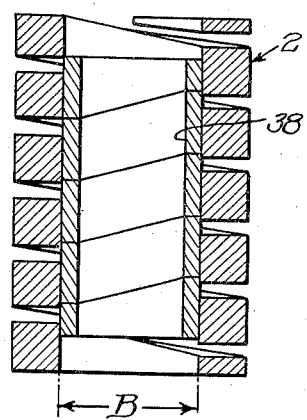
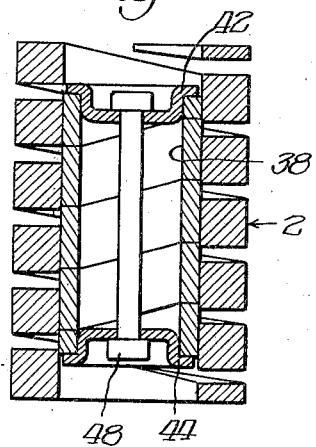
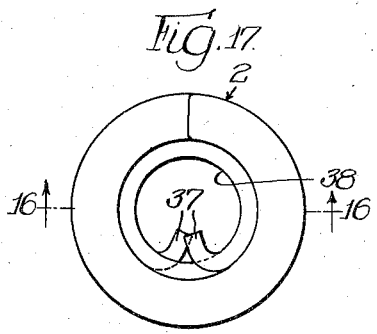
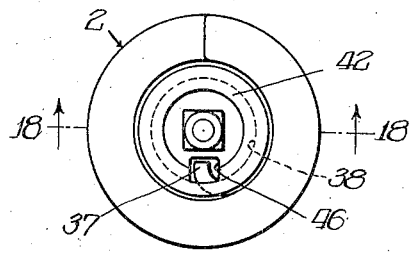
Inventors:
Raymond C. Pierce,
William C. Hedgcock Patented Nov. 15, 1938

2,136,908

UNITED STATES PATENT OFFICE 2,136,908

SNUBBER SPRING

Raymond C. Pierce and William C. Hedgcock, Chicago, Ill., assignors, by mesne assignments, to Raymond C. Pierce Application September 8, 1936, Serial No. 99,773

12 Claims. (Cl. 267—9)

Our invention relates to frictional devices and more particularly a novel form of such a device consisting of a plurality of coil springs generating friction when operating under load.

We are aware of the fact that it is old to wrap one coil spring around another for the purpose of securing friction between the two when in operation. It is an object of our invention, however, to provide a novel form of such a friction absorbing device wherein the amount of friction between the parts can be maintained within predetermined limits.

Still another object of our invention is to design a novel friction absorbing device consisting of a minimum number of parts and, at the same time, generating a maximum frictional capacity.

Still another object of our invention is to provide a friction absorbing device which may be a substitute for coil springs of present standard sizes as used on American railways.

Yet another object of our invention is to so arrange the parts in such a friction absorbing device that the maximum friction development capacity will be maintained throughout the life of the parts.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation of the inner spring used in one embodiment of our invention;

Figure 2 is a top plan view of the spring structure shown in Figure 1;

Figure 3 is a side elevation of the outer coil spring used in conjunction with the inner coil spring in one embodiment of our invention;

Figure 4 is a top plan view of the spring structure shown in Figure 3;

Figure 5 is a vertical sectional view through one turn of the coil shown in Figure 3, the view being taken substantially in the vertical plane bisecting the coil;

Figures 6, 7 and 8 are corresponding sectional views taken through one turn of modified forms of spring structures which we may use in modifications of our invention;

Figure 9 is a vertical sectional view of one form of our invention wherein the coil spring of Figure 1 is assembled within that of Figure 3, the section being taken substantially in the vertical plane bisecting the structure;

Figure 10 is a top plan view of the assembly structure shown in Figure 9;

Figure 15 is a side elevation of a modified inner spring which we may use in a further embodiment of our invention;

Figure 16 is a vertical sectional view of an embodiment of our spring and snubber assembly wherein the outer coil of Figure 3 is used in conjunction with the inner coil of Figure 15, the section being taken substantially in the plane indicated by the line 16—16 of Figure 17;

Figure 17 is a top plan view of the structure shown in Figure 16;

Figure 18 is a vertical sectional view of a modification of the structure shown in Figure 16 wherein the inner coil is confined by the spring caps, the section being taken substantially in the plane indicated by the line 18—18 of Figure 19; and Figure 19 is a top plan view of the structure shown in Figure 18.

Figure 12:
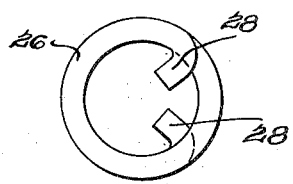
Figure 12 is a top plan view of the coil shown in Figure 11.
Figure 14:
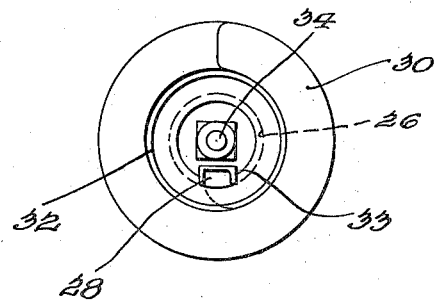
Figure 14 is a top plan view of the assembly structure shown in Figure 13.
Figure 11:
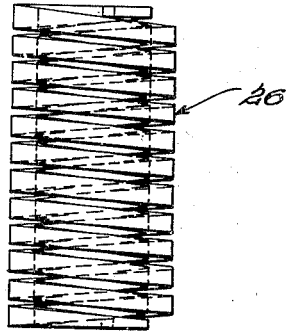
Figure 11 is a side elevation of a modified form of inner coil.

Describing our invention in more detail, it may consist generally of an outer coil spring 2 of square or other polygonal cross section, the end turns of which may be ground off or otherwise formed as at 4—4 in order to provide smooth ends normal to the length of the coil and suitable for seating purposes. This outer coil may consist of any convenient number of turns 6—6 of any convenient bar size depending upon the capacity of spring desired and the function it is designed to perform. The inner coil 8, shown in Figure 1, may likewise be formed from square bar stock or stock of other polygonal cross section and may be provided with special seizing means at each end as the hook-like structures 10—10 which may be conveniently used in assembling the parts as hereinafter described. As in the case of the outer coil, the inner coil may consist of any convenient number of turns 12—12 of bar stock selected to meet the requirements of the particular service in which the assembly is to be used.

In two of the modifications of our invention shown, both coil springs are of square stock, but either of them might be formed from stock having the rectangular cross section 14 (Figure 6) or of the substantially square section 16 (Figure 7) wherein the corners are rounded as at 18—18 or again of stock of the form shown at 20 (Figure 8) substantially octagonal in cross section. Bar stock of these particular cross sections are especially suitable for use in our novel friction absorbing structure, but it will be readily understood that inner and outer coils formed of any of the well-known types of bar stock, circular or otherwise, might be used. We believe, however, that the most efficient forms are those shown.

In assembling the parts of our invention in the modification shown in Figures 1 to 4, 9 and 10, the inner coil 8 may be seized at its ends by the hook-like means 10—10 and torsionally wound up so as to reduce its diameter from the normal as shown at A until it is slightly less than the normal inner diameter B of the outer coil 2; while so torsionally held, the inner coil 8 may be inserted within the outer coil 2 and released within the outer coil 2 as shown in Figure 9. At the moment of release the inner coil 8 will tend to expand to its normal outer diameter A, but will be restrained by confinement within the outer coil 2 whose normal inner diameter B may be slightly increased by the pressure exerted as the inner coil 8 tends to expand to its normal diameter. After the inner coil 8 is assembled within the outer coil 2, the hook-like means 10 may be ground off or otherwise removed so that the top and bottom surfaces 22 and 24 of the assembled structure shown in Figure 9 may present a smooth seating surface normal to the length of the assembly. It will readily be understood of course that in order to assemble any of these structures we may expand the outer coil by any convenient means instead of reducing the diameter of the inner coil.

It is to be particularly noted that a feature of our invention consists in the fact that the outer spring is wound in a direction opposite that in which the inner spring is wound; thus, when the inner spring has been assembled within the outer spring, there is less shearing action between the edges of the turns of the respective springs. It will readily be understood, however, that in the embodiment shown in Figures 16 to 19 we may utilize an inner coil wound in the same direction as the outer coil with which it is associated inasmuch as the inner coil is so wound as to present a substantially cylindrical outer surface, thus obviating such shearing action as that above described.

Figure 13:
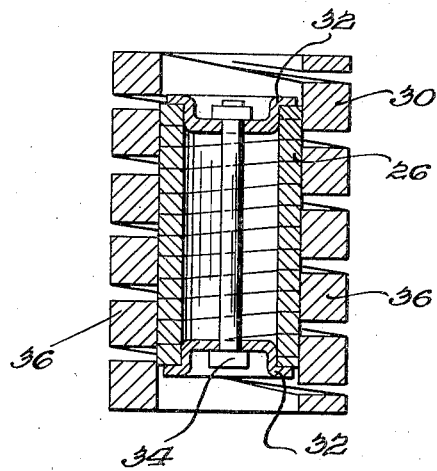
Figure 13 is a vertical sectional view of a modified form of our invention wherein the inner coil shown in Figure 11 is assembled within the outer coil shown in Figure 3.

In the modified form of our invention shown in Figures 11, 12, 13 and 14, the inner coil 26 has its opposite ends in-turned as at 28—28 to provide means which may be seized to torsionally wind it up, after the manner previously described with respect to the inner coil spring 8, after which it may be inserted in an outer coil 30 and allowed to expand therein against the inner faces of the outer coil as shown in Figure 13. In this modification of our invention, however, the inner coil is confined against longitudinal expansion by the top and bottom spring caps 32—32 which are fixed in position by the bolt and nut assembly 34. The spring caps 32 have the slots 33 within which may be received the in-turned ends 28 facilitating assembly. In this form the inner spring 26 presents a substantially smooth outer surface. Enough space, however, will be provided between the adjacent turns 36 to permit the inner coil to accommodate itself to the normal flexing under load of the outer coil.

In this second modification of our invention, the height or length of the inner spring of the coil assembly as shown in Figure 13 may be modified to suit the purpose desired although as shown it is confined substantially to its solid height.

It is apparent of course that in this modification a portion of the outer coil may be left free of contact with the inner coil and in the modification shown in Figure 13 a small portion of the outer coil has been left free at each end. It is apparent of course that this free portion of the outer coil might be provided at the top of the coil or at the bottom or, as shown, at both ends. By such an arrangement that portion of the outer coil which is to be subjected to friction may be definitely determined and any desired portion may be retained for free coil spring action without friction so that the entire assembly constitutes a combination of unrestricted spring action and snubber spring action, one above the other, or as sometimes described, in series.

In the modifications of our inventions shown in Figures 13 and 18, wherein the inner coil is confined substantially to a fixed height, it is desirable to provide sufficient compression in the said inner coil to enable it substantially to maintain a fixed height in spite of the friction which will be developed by the said inner coil and the confining outer coil; in other words, the inner spring must be under sufficient tension in order to maintain its form under the frictional load which will be applied on its outer surface.

In the modifications described, we have shown a friction absorbing device wherein constant positive pressure of predetermined amount is obtained between the inner and outer coil springs. By varying the relative capacity of the inner and outer coils and the relation between the normal outside diameter of the inner coil and the normal inside diameter of the outer coil, any desired variation of pressure between the two when assembled may be secured. Therefore, up to the capacity of the parts involved, any desired amount of friction may be secured, and this friction, if desired, may be in combination with free spring action on the part of a portion of the outer coil spring.

In Figure 15 we have shown a modified form of inner coil 38 wherein the coil is formed from a flat bar, the coil being rolled with its relatively few successive turns 40—40 closely adjacent each other, presenting a generally cylindrical structure in its final form and having an outside diameter A of predetermined amount larger than the inside diameter of the outer coil 2 within which it may be assembled. The form of the bar is best shown in the sectional view of Figure 16 wherein it will be observed that the width of the bar may be several times its thickness. This inner coil is provided at its opposite ends with the hook-like seizing means 37—37 for the purpose already described.

In the modification shown in Figures 18 and 19 we utilize the inner coil 38 and the outer coil 2, the inner coil having the usual end seizing means 37 and being confined to a relatively fixed height by the top and bottom spring caps 42 and 44, each of said caps being provided with the slot 46 within which may be received the hook-like means 37, said end caps 42 and 44 being maintained in position by the bolt and nut assembly 48.

In the inner coil 38, as utilized in the structure shown in Figures 16 to 18 the successive turns 40—40 are wound in close proximity to each other, only sufficient space being left between them to permit the coil to flex on its vertical axis in unison with the outer confining coil 2, it being understood, of course, that the form of flexure of the outer coil will depend upon the manner in which the load is placed upon it. Such loads are frequently eccentric thus causing the coil to assume some position other than the normal vertical one. It is necessary, therefore, to provide sufficient space between the turns of the inner coil as will permit it to follow the movements of the outer coil under load conditions.

It will be further observed that the inner coil 38, formed of wide, flat bar, will present much greater resistance to vertical deflection than would be the case if a similar weight of material were wound in a spring of substantially square stock.

It is understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. In a friction absorbing device the combination of inner and outer coils having a plurality of turns wound in reverse directions, said inner coil having an outside diameter normally greater than the inside diameter of said outer coil and having means for torsionally winding same for insertion into said outer coil, said inner coil being formed of substantially rectangular stock, and means confining said inner coil to a maximum height whereby said inner coil presents a substantially smooth cylindrical outer surface.

2. A friction absorbing device comprising inner and outer coils, means for confining one of said coils to a relatively fixed height less than the height of the other of said coils, said inner coil having a normal outside diameter greater by a predetermined amount than the normal inside diameter of said outer coil and being placed under torsional tension for insertion thereinto whereby in operation a predetermined amount of frictional absorption is developed between said coils.

3. A friction absorbing device comprising inner and outer coils having a plurality of turns wound in opposite directions, said inner coil having an outside diameter normally greater than the inside diameter of said outer coil, said inner coil being formed of stock of substantially rectangular cross section, and means confining said inner coil to a relatively fixed height thereby presenting a substantially cylindrical outer friction surface.

4. A friction absorbing device comprising inner and outer coils of multiple turns wound in opposite directions, means confining one of said coils to a maximum height less than the other of said coils, said coils being formed of stock of polygonal cross section and having their friction faces parallel to the axis of said device, the normal outside diameter of said inner coil being of predetermined amount greater than the normal inside diameter of said outer coil whereby a predetermined amount of frictional absorption may be developed between said coils.

5. A friction absorbing device comprising inner and outer coils wound in opposite directions, said coils being formed of stock of polygonal cross section and having friction faces parallel to the axis of said device, and means confining said inner coil to a relatively fixed height thereby presenting a substantially smooth outer surface for engagement with said outer coil.

6. A friction absorbing device comprising inner and outer coils wound in reverse direction, end means on said inner coil for torsionally winding same, said inner coil being formed of stock of polygonal cross section, and means confining said inner coil to a maximum height thereby presenting a substantially smooth cylindrical outer surface.

7. A friction absorbing device comprising inner and outer coils of multiple turns wound in opposite directions, and means confining said inner coil to a relatively fixed height less than the height of said outer coil whereby said device constitutes a series arrangement of unrestrained spring action and snubber spring action, said inner coil in assembly presenting a substantially smooth cylindrical outer surface.

8. In a friction shock absorbing device the combination of inner and outer coils of multiple turns wound in reverse directions, each of said coils having a friction face parallel to the axis of said device, means confining one of said coils to a maximum height less than the other of said coils, and means on one of said coils for torsionally winding same, said winding means having cooperation with said confining means after assembly of said parts.

9. A friction shock absorbing device comprising inner and outer coils of multiple turns wound in reverse directions, said inner coil having a normal outside diameter of pre-determined amount greater than the normal inside diameter of said outer coil, means on said inner coil for placing said inner coil under torsional tension, and means for confining said inner coil to a relatively fixed height less than the height of said outer coil, said first mentioned means cooperating with said last mentioned means when the parts are assembled for operation.

10. A friction absorbing device comprising inner and outer coils of multiple turns wound in reverse directions, said coils being formed of stock of polygonal cross section and having friction faces parallel to the axis of said device, means confining said inner coil to a relatively fixed height, and means integral with said inner coil for placing said coil under torsional tension, said first mentioned means cooperating with said last mentioned means when said parts are in operative assembly.

11. A friction absorbing device comprising inner and outer coil springs of multiple turns wound in opposite directions, the normal outside diameter of said inner coil being greater by a pre-determined amount than the normal inside diameter of the outer coil but coinciding therewith after assembly whereby in operation a predetermined amount of frictional absorption is developed between said coils, means confining one of said coils to a height less than the other of said coils, and integral means on said coil of lesser height cooperating with said first mentioned means when said parts are in operative assembly.

12. A friction absorbing device comprising inner and outer coils of multiple turns wound in reverse directions, end means on said inner coils for torsionally winding same, means confining said inner coil to a maximum height thereby presenting a substantially smooth cylindrical outer surface, said end means and said last mentioned means having cooperation with each other when said parts are in operative assembly.

RAYMOND C. PIERCE.
WILLIAM C. HEDGCOCK.